United States Patent
Chou

(10) Patent No.: US 7,746,583 B2
(45) Date of Patent: Jun. 29, 2010

(54) LENS APPARATUS

(75) Inventor: Cheng-Hung Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 25 days.

(21) Appl. No.: 12/171,254

(22) Filed: Jul. 10, 2008

(65) Prior Publication Data

US 2009/0109557 A1   Apr. 30, 2009

(30) Foreign Application Priority Data

Oct. 25, 2007   (CN) .......................... 2007 1 0202272

(51) Int. Cl.
*G02B 7/02*   (2006.01)

(52) U.S. Cl. ...................................... 359/824; 359/696

(58) Field of Classification Search ................. 359/694, 359/696, 821–824, 698; 396/79; 353/101
See application file for complete search history.

(56) References Cited

U.S. PATENT DOCUMENTS 7,154,199 B2 * 12/2006 Yasuda ..................... 310/12.24

FOREIGN PATENT DOCUMENTS

CN    200620053760.X Y    2/2007

* cited by examiner

*Primary Examiner*—Joseph Martinez
(74) *Attorney, Agent, or Firm*—Zhigang Ma

(57) ABSTRACT

A lens apparatus includes a barrel and a focus member mounted on the barrel. The barrel includes a fixing body and an engaging unit disposed at an outside wall of the fixing body. The focus member includes a retaining body contacted with the outside wall of the fixing body and a retaining unit disposed at an inside wall of the retaining body. The retaining unit and the engaging unit fasten each other for mounting the focus member on the barrel. When a force is applied on the focus member, the focus member drives the barrel to rotate by a friction generated between the retaining unit and the engaging unit.

14 Claims, 3 Drawing Sheets

LENS APPARATUS

BACKGROUND

1. Technical Field

The present invention relates to a lens apparatus and, particularly, to a lens apparatus having a barrel and a focus member, which are ready to be assembled together.

2. Description of the Related Art

Lens apparatuses usually include a first barrel member, a second barrel member, and a focusing ring. The first barrel member may be an externally threaded barrel within which a first lens optical system is mounted. The second barrel member may be an internally threaded barrel within which a second optical system is mounted. The first and second barrels are threadedly and adjustably attached to each other. The focusing ring is mounted on the second barrel member in order to cause the axial movement of the first barrel member relative to the second barrel member.

However, the focusing ring is usually mounted on the second barrel member with several screws; an assembler has to use a screwdriver to fasten the screws into the focusing ring and the second barrel member one by one. The process is cumbersome and time-consuming, particularly in mass production.

What is needed, therefore, is a lens apparatus, which has a barrel and a focus member, which are easy to be assembled together.

SUMMARY

In accordance with a present embodiment, a lens apparatus includes a barrel and a focus member mounted on the barrel. The barrel includes a fixing body and an engaging unit disposed at an outside wall of the fixing body. The focus member includes a retaining body contacted with the outside wall of the fixing body and a retaining unit disposed at an inside wall of the retaining body. The retaining unit and the engaging unit fasten to each other for mounting the focus member on the barrel. When a force is applied on the focus member, the focus member drives the barrel to rotate by a friction generated between the retaining unit and the engaging unit.

Other advantages and novel features will be drawn from the following detailed description of at least one preferred embodiment, when considered in conjunction with the attached drawings.

BRIEF DESCRIPTION OF THE DRAWINGS

Many aspects of the present lens apparatus can be better understood with reference to the attached drawings. The components in the drawings are not necessarily drawn to scale, the emphasis instead being placed upon clearly illustrating the principles of the present lens apparatus. Moreover, in the drawings, like reference numerals designate corresponding parts throughout the several views.

DETAILED DESCRIPTION

Embodiments of the present lens apparatus will now be described in detail below and with reference to the drawings.

Figure 1:
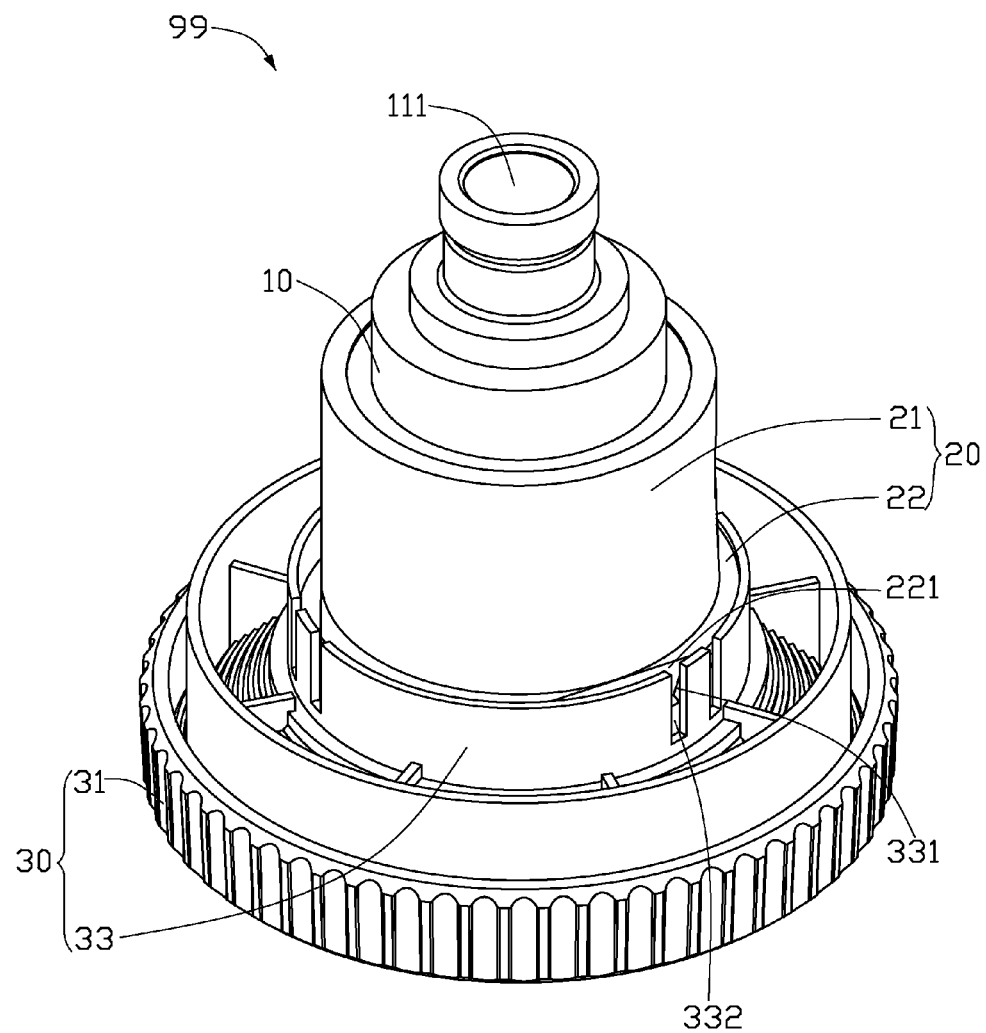
FIG. 1 is an isometric view of a lens apparatus, according to an embodiment.

Referring to FIG. 1, a lens apparatus 99 in accordance with an embodiment is shown. The lens apparatus 99 includes a lens drum 10, a barrel 20 and a focus member 30 mounted on the barrel 20. When force is applied on the focus member 30, the focus member 30 can drive the barrel 20 to rotate relative to the lens drum 10 to adjust the focus of the lens apparatus 99.

Figure 2:
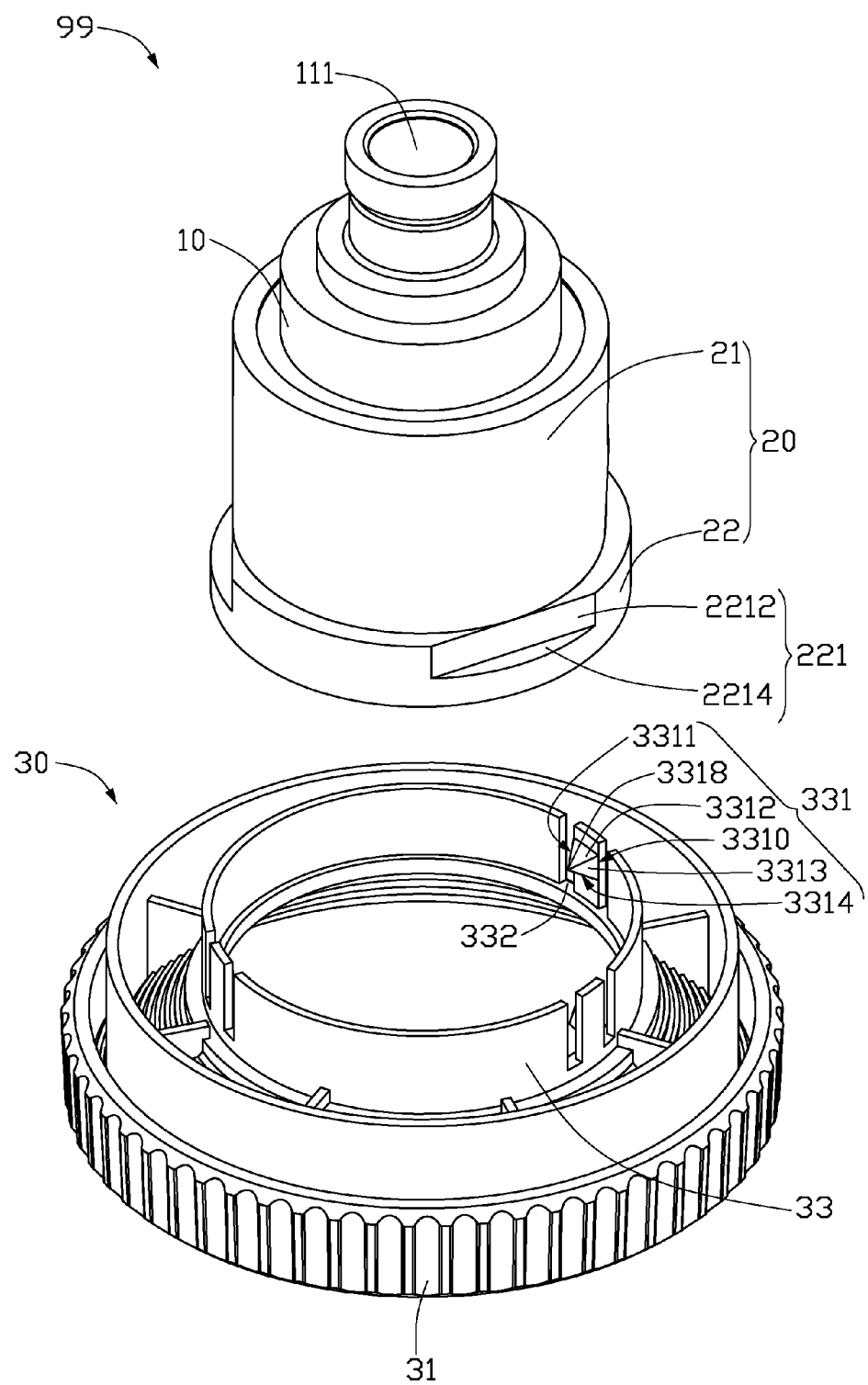
FIG. 2 is a partially exploded, isometric view of the lens apparatus in FIG. 1.
Figure 3:
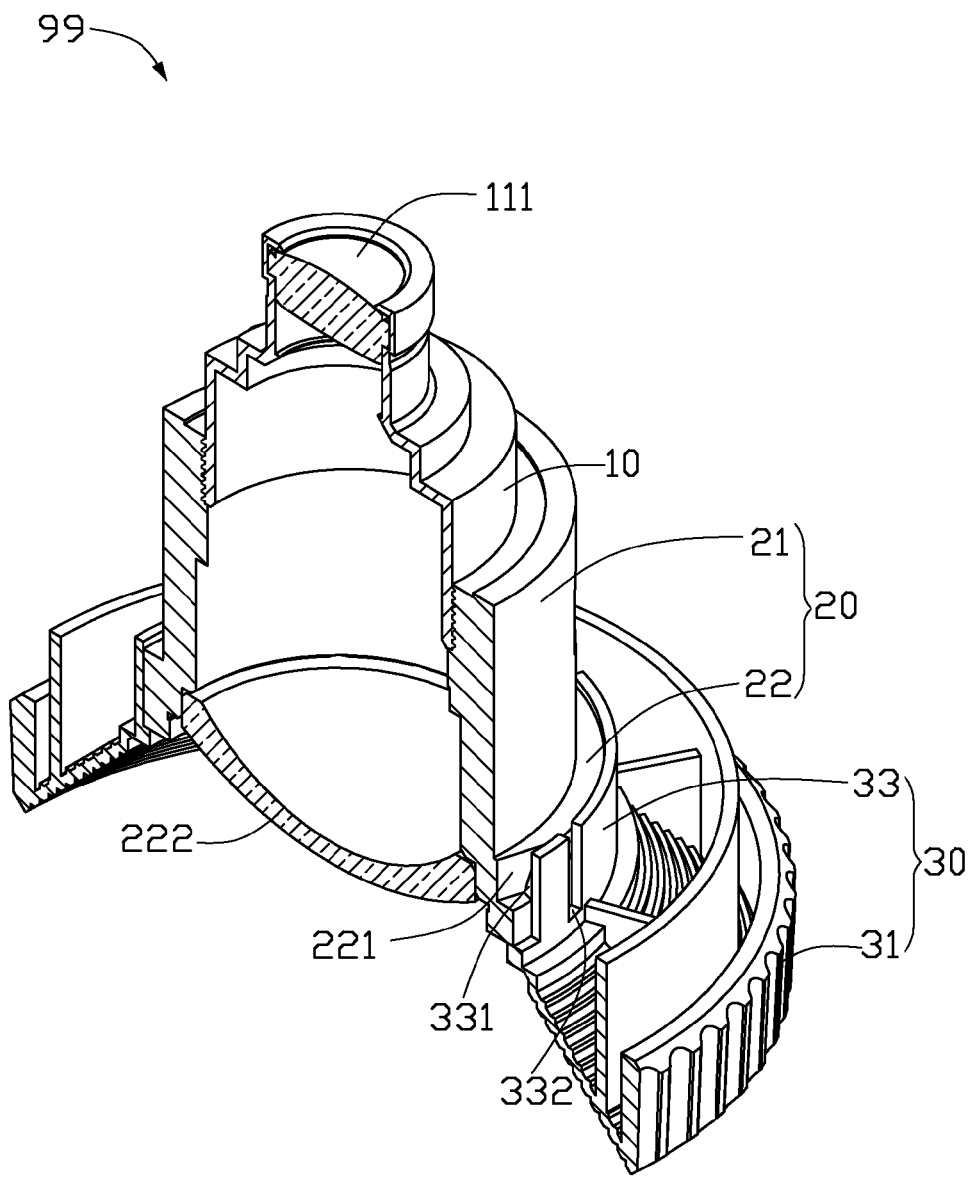
FIG. 3 is a longitudinal sectional view of the lens apparatus in FIG. 1.

Referring to FIGS. 2 and 3, the lens drum 10 is an externally threaded hollow step-shaped tube. A first optical lens system 111 is mounted within the lens drum 10.

The barrel 20 is also a hollow step-shaped tube. The barrel 20 includes a receiving body 21, and a fixing body 22 that has a diameter larger than that of the receiving body 21. The receiving body 21 coaxially and upwardly extends from the fixing body 22. The receiving body 21 is provided for receiving a second optical lens system 222 (shown in FIG. 3) and is internally threaded to receive the lens drum 10 therein. The lens drum 10 is coaxially received in the receiving body 21, and threadedly engaged to enable relative axial movement therebetween.

The fixing body 22 includes three engaging units 221 disposed on the top side of an outside wall thereof. The three engaging units 221 are symmetrically disposed around a periphery of the fixing body 22. Each engaging unit 221 is a cutout, which is defined by two perpendicular surfaces, including a horizontal supporting surface 2214 and a vertical abutting surface 2212. The abutting surface 2212 is tangent to the outer wall of the receiving body 21.

The focus member 30 is mounted on the barrel 20. The focus member 30 includes a round operating body 31 and an annular retaining body 33 coaxially disposed in the operating body 31.

The retaining body 33 includes three retaining units 331 corresponding to the engaging units 221, respectively. The retaining units 331 extend from an inside wall of the retaining body 33 and point to a center of the retaining body 33. Each retaining unit 331 has a four sided pyramid configuration, and includes a rectangular bottom 3310 attached at the retaining body 33, an apex 3318 and four triangular side surfaces 3311, 3312, 3313, 3314. An orthographic projection of the apex 3318 on a surface on which the bottom 3310 exists, is within the outline of the bottom 3310. The side surfaces 3311, 3312, 3313, 3314 extend between the bottom 3310 and the apex 3318.

Two slots 332 are defined in the retaining body 33 adjacent sides of each retaining unit 331 to increase the flexibility of the retaining units 331 (six slots in total). In other embodiments, there may be only one slot defined to one side of each retaining unit, and the slot may be U-shaped or V-shaped and so on.

During assembling of the lens apparatus 99, the barrel 20 is first coaxially disposed in the annular retaining body 33 with an outer wall of the fixing body 22 partly enclosed by the annular retaining body 33. Then, the barrel 20 is pushed to slide downwards into the focus member 30 with the engaging units 221 aligning with the retaining units 331 in a one-to-one manner. In this stage, the fixing body 22 contacts with a corresponding retaining unit 331, and pushes the corresponding retaining unit 331 outwards and pass through the retaining unit 331 due to an elastic deformation of the retaining unit 331. Since the side surface 3312 and the bottom 3310 are oriented to define an acute angle, the barrel 20 can easily slide past the retaining units 331. Sequentially, the retaining units 331 return to their original state, and the retaining units 331 come into engagement with the engaging units 221 in a one-to-one manner. Therefore, the focus member 30 is mounted on the barrel 20 via engagement of the retaining units 331 and the engaging units 221. Finally, the lens drum 10 is coaxially installed in the receiving body 21 to form the lens apparatus 99.

When the lens apparatus 99 is assembled, the apex 3318 abuts against the abutting surface 2212, and the side surface 3314 is supported on the supporting surface 2214. When a force is applied on the operating body 31, the focus member 30 can drive the barrel 20 to rotate relative to the lens drum 10 by a friction generated between the retaining units 331 and the engaging units 221 to adjust the focus of the lens apparatus 99.

As described above, the focus member 30 is mounted on the barrel 20 just by pushing the barrel 20 to slide past the retaining units 331. Thus, the process of assembling the lens apparatus 99 is very convenient and time-saving, which helps to reduce the cost per unit.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A lens apparatus comprising:
   a barrel comprising a fixing body and an engaging unit disposed at an outside wall of the fixing body; and
   a focus member mounted on the barrel, the focus member comprising a retaining body contacted with the outside wall of the fixing body and a retaining unit disposed at an inside wall of the retaining body;
   wherein the retaining unit and the engaging unit fasten each other for mounting the focus member on the barrel; and
   wherein when a force is applied on the focus member, the focus member drives the barrel to rotate by a friction generated between the retaining unit and the engaging unit.

2. The lens apparatus as claimed in claim 1, wherein two slots are defined in the retaining body at two opposite sides of the retaining unit to increase the flexibility of the retaining unit.

3. The lens apparatus as claimed in claim 1, wherein the focus member further comprises a plurality of retaining units disposed at the inside wall of the retaining body, and the barrel further comprises a plurality of engaging units disposed at the outside wall of the fixing body, and the retaining units engage with the engaging units in a one-to-one manner.

4. The lens apparatus as claimed in claim 3, wherein the retaining units are symmetrically disposed around the retaining body, and the engaging units are symmetrically disposed around the fixing body.

5. The lens apparatus as claimed in claim 4, wherein the retaining body is annular.

6. The lens apparatus as claimed in claim 5, wherein the retaining units point to a center of the retaining body.

7. The lens apparatus as claimed in claim 1, further comprising a lens drum coaxially received in the barrel.

8. The lens apparatus as claimed in claim 7, wherein the barrel further comprises a receiving body coaxially extending from the fixing body and the lens drum is coaxially received in the receiving body.

9. The lens apparatus as claimed in claim 8, wherein the fixing body and the receiving body are a hollow tube body, and the fixing body has a diameter larger than that of the receiving body.

10. The lens apparatus as claimed in claim 9, wherein the engaging unit comprises a cutout defined in the fixing body, and the cutout is defined by a horizontal supporting surface and a vertical abutting surface.

11. The lens apparatus as claimed in claim 10, wherein the abutting surface is tangent to an outer wall of the receiving body.

12. The lens apparatus as claimed in claim 10, wherein the retaining unit has a pyramid configuration, and comprises a cone bottom attached at the retaining body, the cone apex and a plurality of side surfaces extending between the cone bottom and the cone apex; and wherein when the retaining unit engages with the engaging unit, the cone apex abuts against the vertical abutting surface and at least one of the side surfaces is supported on the horizontal supporting surface.

13. The lens apparatus as claimed in claim 12, wherein an orthographic projection of the cone apex on a surface, on which the cone bottom exists, is within the cone bottom.

14. The lens apparatus as claimed in claim 13, wherein each of the side surfaces and the cone bottom are oriented to define an acute angle.

\* \* \* \* \*